US006240432B1

(12) United States Patent
Chuang et al.

(10) Patent No.: US 6,240,432 B1
(45) Date of Patent: May 29, 2001

(54) ENHANCED RANDOM NUMBER GENERATOR

(75) Inventors: Wei-Tong Chuang, Taichung; Sandy C. Hsu, Taipei, both of (TW)

(73) Assignee: Vanguard International Semiconductor Corporation, Hsin-chu (TW)

( * ) Notice: Subject to any disclaimer, the term of this patent is extended or adjusted under 35 U.S.C. 154(b) by 0 days.

(21) Appl. No.: 09/222,271

(22) Filed: Dec. 28, 1998

(51) Int. Cl.[7] .................... G06F 1/02
(52) U.S. Cl. .................... 708/252
(58) Field of Search .................... 708/250, 251, 708/252, 253, 254, 255, 256

(56) References Cited

U.S. PATENT DOCUMENTS 4,641,102 2/1987 Coulthart et al. .
4,785,410 * 11/1988 Hamatsu et al. .................... 708/251
4,799,259 1/1989 Ogrodski .
4,855,690 * 8/1989 Dias .................... 331/78
4,905,176 2/1990 Schutz .
5,327,365 7/1994 Fujisaki et al. .
5,596,617 1/1997 Wolf et al. .
5,706,218 1/1998 Hoffman .
5,867,409 * 2/1999 Nozuyama .................... 377/72

* cited by examiner

*Primary Examiner*—Chuong Dinh Ngo
(74) *Attorney, Agent, or Firm*—George O. Saile; Stephen B. Ackerman

(57) ABSTRACT

In this invention is described a linear feedback shift register that is enhanced with XOR circuits and free running oscillators to maximize the random nature of the sequence of digital bit created at the output of the generator in response to a clock signal. XOR circuits are included in the feedback path of a LFSR to randomize digital signals being fed back from the output to the input. Additional XOR circuits are interposed between stages of the LFSR and each connected to a high frequency oscillator to randomize the digital signals flowing between stages of the LFSR. The frequency of the oscillators are set so as not to be duplicated, and not to be a factor or multiple of another oscillator connected to the enhanced LFSR. The frequency of the oscillators are higher than the frequency of the clock used to step the LFSR. The output of the LFSR is a highly randomized sequence of digital bits that can be used in integrated circuits for such purposes as Smart Cards.

9 Claims, 3 Drawing Sheets

ENHANCED RANDOM NUMBER GENERATOR

BACKGROUND OF THE INVENTION

1. Field of Invention

This invention relates to integrated circuits and in particular random number generators.

2. Description of Related Art

Random number generating circuits are well known. The most common of these circuits are based on the noise property of a biased semiconductor device. Some circuits use oscillators and rely on the natural variation in the frequency of slow oscillators to control the sampling of faster oscillators.

In U.S. Pat. No. 5,706,218 (Hoffman) a single, slow voltage controlled oscillator receives a noise input and controls the sampling of a set of ring oscillators. A circuit is used at the output of each ring oscillator to ensure that there is a near even distribution of logical ones and zeros in the random numbers. In U.S. Pat. No. 5,596,617 (Wolfe et al.) a feed back shift register of N stages has exclusive OR (XOR) circuits in the feedback logic and a gated clock which produces one blocked clock pulse in $2^n$ clock pulses. In U.S. Pat. No. 5,327,365 (Fujisaki et al.) a parent processor in a parallel processor generates random number initial values and distributed the initial values to child processor elements which conduct processing to generate random numbers. In U.S. Pat. No. 4,905,176 (Schultz) a random number generator is disclosed which is based upon low frequency sampling of the output of a pseudo-random number generator that operates at a varying frequency from a free running ring oscillator. In U.S. Pat. No. 4,799,259 (Ogrodski) an array of oscillators operating at different frequencies is used as an input to an XOR network. The XOR network provides an output signal to a clocked D-type flip flop which samples the state of the random output signal from the XOR network. In U.S. Pat. No. 4,641,102 (Coulthart et al.) a five state ring counter is gated to a set of XOR circuits interposed between stages of a five stage shift register connected as a feedback shift register. A D-type flip flop with a low frequency clock and a high frequency data square wave controls the gating of the five stage ring counter to the set of XOR circuits.

Random number generators are useful in applications such as Smart Cards. It is therefore a requirement that random number generators be able to put into integrated circuits and utilize a relatively few components. It is also necessary that the output of the random number generator not be deterministic with a relatively short period as is the case with a simple linear feedback shift register where the feedback is XORed with certain bits in the shift register.

SUMMARY OF THE INVENTION

One objective of this invention is to provide a random number generator circuit that creates a clocked output in response to a clock signal and using relatively few components. Another objective of this invention is to provide a random number generator circuit for use in integrated circuit devices.

In this invention a circuit for generating a random bit sequence utilizes a linear feedback shift register (LFSR) and a set of ring oscillators. The LFSR has XOR circuites in the feedback to randomize the feedback signal and XOR circuits between each stage of the LFSR to randomize the signals between stages. The XOR circuits in the feedback circuit connect to outputs of selected stages of the LFSR, and the XOR circuits between stages are each connected to a different ring oscillator. The frequencies of the ring oscillators are set to be at a higher frequency than the frequency of the clock used to drive the LFSR and at a frequency different than each other.

The frequency of each ring oscillator connected to the XOR circuits between stages of the LFSR is set by adjusting capacitors in the circuit and by changing the size of the transistors. The period of the frequency oscillation is set to be an irrational number that is not repeated among the ring oscillators to avoid cyclic repetition and maximize the randomness of the random number generator. An alternative to using an irrational number for the period of oscillation is to set the frequency of each oscillator to be relatively primal with each other. In that way the period of oscillation will not be a multiple of any other frequency and will not have a common divider other than one.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
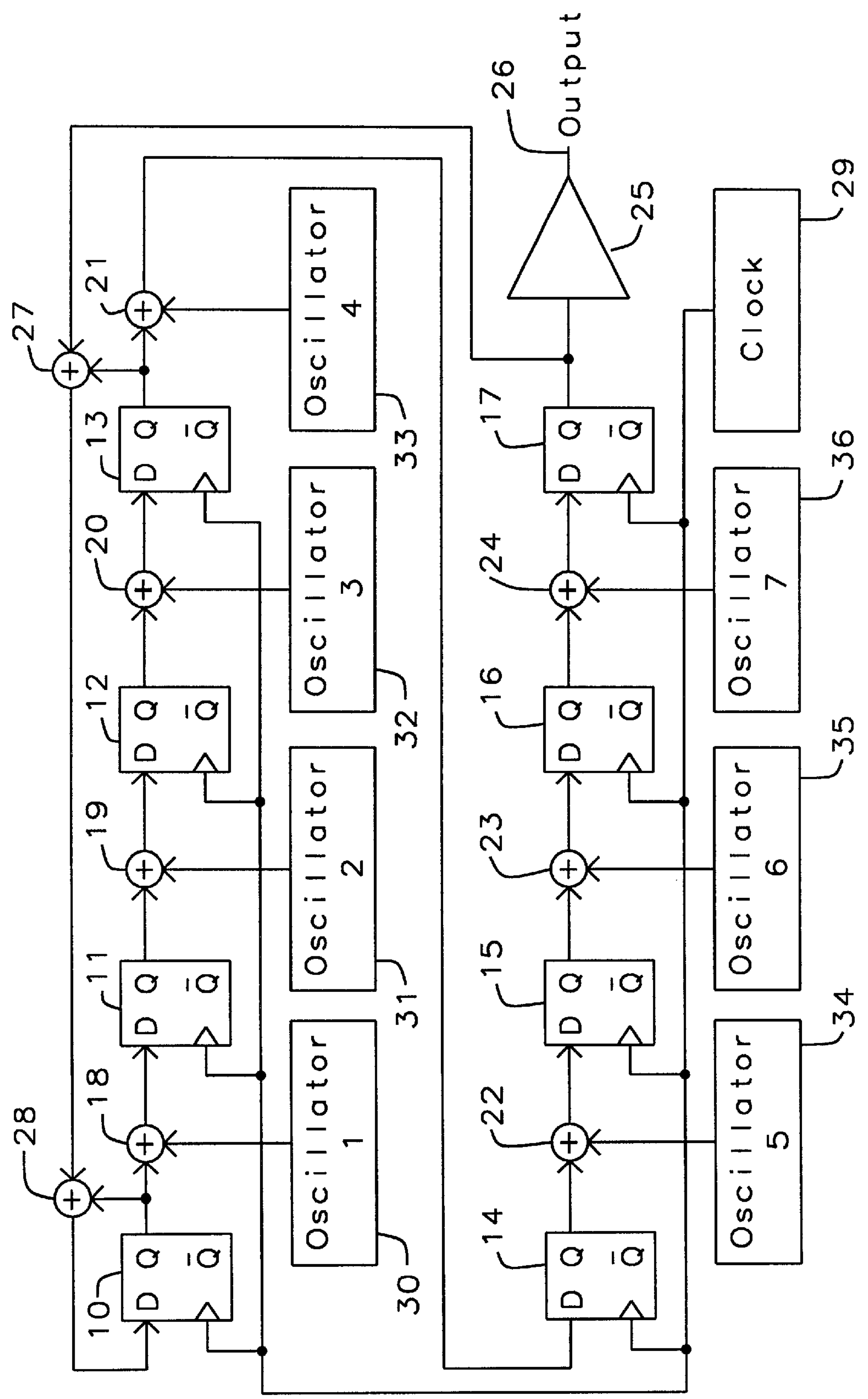
FIG. 1 is a block diagram of the random number generator of this invention.

Referring to FIG. 1 a block diagram of the random number generator of this invention is shown. A set of eight D-type flip flops 10, 11, 12, 13, 14, 15, 16 and 17 used as registers are connected in series with XOR circuits 18, 19, 20, 21, 22, 23 and 24. Although a D-type flip flop is described here other type of registers that are clocked could also be used. A clock 29 is connected to the clock input of each register 10, 11, 12, 13, 14, 15, 16 and 17. The output of the last register 17 is connected to a circuit output 26 through an inverter 25. The output of register 17 is fed back to the input register 10 through two XOR circuits 27 an 28. XOR circuit 27 is connected to the output of register 13 and XOR circuit 28 is connected to the output of register 10. These XOR 27 and 28 circuits in the feedback path randomize the bits being fed back from the output of register 17 to the input of register 10. Shown in FIG. 1 is an eight stage linear feedback shift register with XOR circuits interposed in the feed back and between stages. The number of shift registers, the number of interposed XOR circuits in the feedback and the number of stages being interposed with an XOR circuit is not necessarily an optimum design point for all requirement. The number of stages in the shift register can be made larger or smaller and the number of XOR circuits interposed in the feedback can be made larger or smaller. The number of XOR circuits interposed between register circuits can be made larger or smaller independent of the number of register stages.

Continuing to refer to FIG. 1, oscillators 30, 31, 32, 33, 34, 35 and 36 all having a frequency that is higher than the frequency of the clock 29 are connected to the XOR circuits 18, 19, 20, 21, 22, 23 and 24. The frequency of each oscillator 30, 31, 32, 33, 34, 35 and 36 is unique and has a period that is an irrational number that is not duplicated to produce a high amount of randomness. Another possible approach to separating the frequencies of the signal generators is to make each frequency primal with respect to the other frequencies. This would mean that no two frequencies are divisible by any common number except the number one.

Continuing to refer to FIG. 1, the output of register 10 and the output of oscillator (1) 30 are connected to XOR circuit 18 which is connected to the input of register 11 and randomizes the signal between registers 10 and 11. The output of register 11 and the output of oscillator (2) 31 are connected to XOR circuit 19 which is connected to the input of register 12 and randomizes the signal between registers 11 and 12. The output of register 12 and the output of oscillator (3) 32 are connected to XOR circuit 20 which is connected to the input of register 13 and randomizes the signal between registers 12 and 13. The output of register 13 and the output of oscillator (4) 33 are connected to XOR circuit 21 which is connected to the input of register 14 and randomizes the signal between registers 13 and 14. The output of register 14 and the output of oscillator (5) 34 are connected to XOR circuit 22 which is connected to the input of register 15 and randomizes the signal between registers 14 and 15. The output of register 15 and the output of oscillator (6) 35 are connected to XOR circuit 23 which is connected to the input of register 16 and randomizes the signal between registers 15 and 16. The output of register 16 and the output of oscillator (7) 36 are connected to XOR circuit 24 which is connected to the input of register 17 and randomizes the signal between registers 16 and 17. Not all outputs of the registers 10, 11, 12, 13, 14, 15, 16 and 17 need to have an XOR circuit imposed between the output of the register circuit and the input to the subsequent register stage to produce a highly randomized number.

Figure 2:
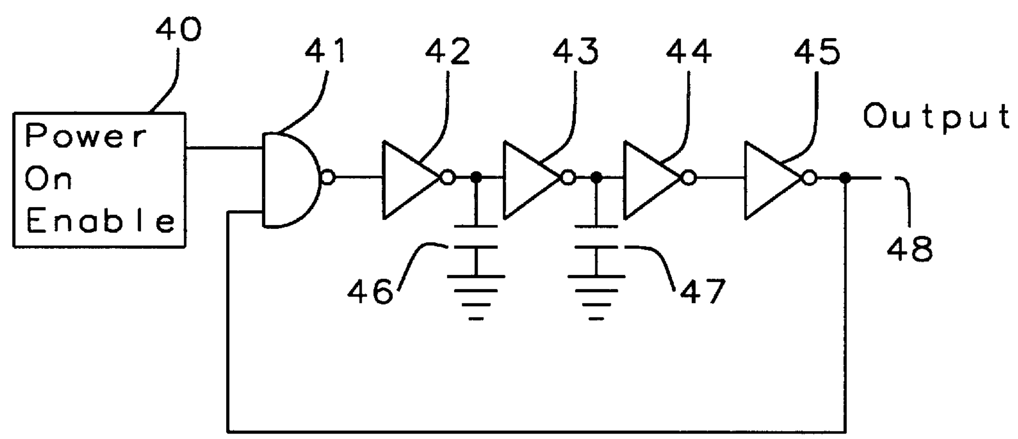
FIG. 2 is a ring oscillator used in this invention.

Referring to FIG. 2, a ring oscillator is shown with four inverter stages 42, 43, 44 and 45 connected in series with an NAND circuit 41 for a total of five stages in the oscillator, four inverters and the NAND circuit. The output of inverter 45 is connected to the oscillator output and by means of a feedback to a second input of the NAND circuit 41. A power on enable circuit 40 is connected to a first input of the NAND circuit 41 and controls the oscillator on and off. Capacitors 46 and 47 are integrated circuit capacitors that are used to control the frequency of oscillation. The size of the transistors that make up the inverter circuits 42, 43, 44 and 45 and the NAND circuit 41 are adjusted to further control the frequency of the oscillator.

Figure 3:
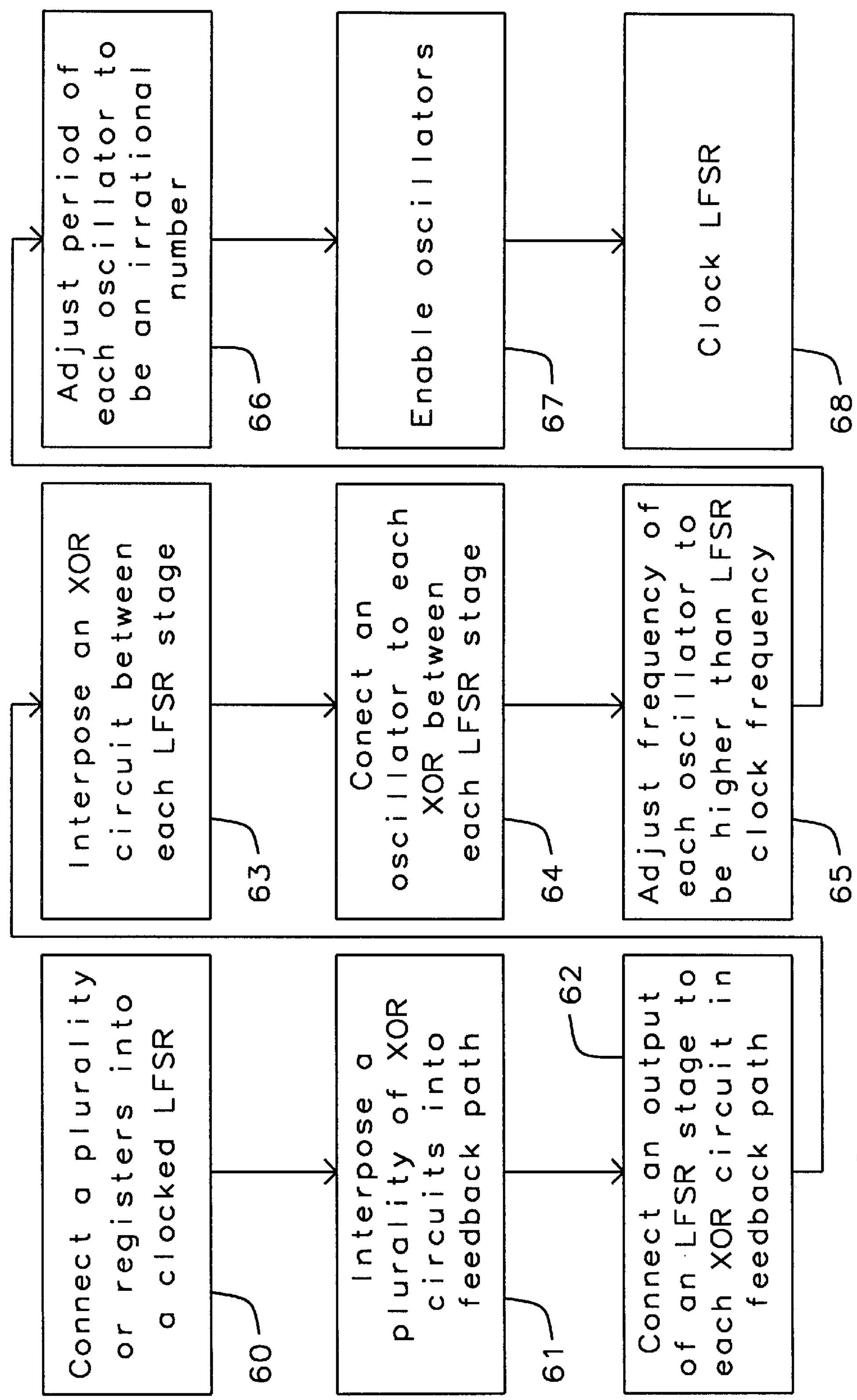
FIG. 3 is a flow diagram of a method to produce.

Referring to FIG. 3, a flow diagram is shown of a method to produce a highly randomized number as a sequence of bits from a linear feedback shift register augmented with XOR circuits and free running oscillators. A plurality of registers are connected into a linear feedback shift register (LFSR) 60. A plurality of XOR circuits are interposed into the feedback path of the LFSR 61. Connect an output of a stage in the LFSR to each XOR circuit in the feedback path of the LFSR 62 to randomize the feedback of the output bits of the linear feedback shift register. Interpose an XOR circuit between each stage of the LFSR 63. Connect an oscillator to each XOR interposed between stages of the LFSR 64. Adjust the frequency of each oscillator to be higher than the clock frequency of the LFSR 65. Adjust the period of the frequency of each oscillator to be an irrational number 66. Enable the oscillators 67 and clock the LFSR to step the enhanced linear feedback shift register to produce highly randomized sequence of bit it its output.

While the invention has been particularly shown and described with reference to preferred embodiments thereof, it will be understood by those skilled in the art that various changes in form and details may be made without departing from the spirit and scope of the invention.

What is claimed is:

1. A random number generator, comprising:

a) a linear feedback shift register having a plurality of shift register stages and a plurality high frequency oscillators, b) an output of said linear feedback shift register fed back to an input through a plurality of feedback XOR circuits connected to outputs of individual registers of said linear feedback shift register, c) said plurality of high frequency oscillators operating at a plurality of frequencies are connected to inputs of said individual registers through a plurality of input XOR circuits, and d) said feedback XOR circuits and said input XOR circuits randomize an output signal of said linear feedback shift register.

2. The random number generator of claim 1, whereas said feedback XOR circuits are connected to an output of stage one and an output of stage four of said linear shift register.

3. The random number generator of clam 1, whereas said input XOR circuit is connected to an input of some of said registers subsequent to a first register in said linear feedback shift register and connected to said high frequency oscillators to further randomize the output of said linear feedback shift register.

4. The random number generator of claim 1, whereas said input XOR circuit is connected to an input of all of said registers subsequent to a first register in said linear feedback shift register and connected to said high frequency oscillators to further randomize the output of said linear feedback shift register.

5. The random number generator of claim 1, whereas said frequency of said plurality of high frequency oscillators are primal to one another and to the linear feedback shift register clock to produce a high degree of randomness of said random number generator.

6. The random number generator of claim 1, whereas periods of the frequencies of said plurality of high frequency oscillators are irrational numbers to avoid a cyclic repetition and produce a high degree of randomness of said random number generator.

7. A method for producing a random number generator with a high degree of randomness, comprising:

a) connecting a plurality of registers into a linear feedback shift register, b) interposing a plurality of XOR circuits into feedback of said linear feedback shift register and connecting said XOR circuits in feedback to an output of a plurality of shift register stages, c) interposing an XOR circuits between each shift register stage and connecting said XOR circuits between shift register stages to a plurality of oscillators, d) adjusting frequency of each oscillator of said plurality of oscillators to be higher than a frequency of a clock connected to said shift register stages, and e) adjusting a period of the frequency of each oscillator of said plurality of oscillators to be an irrational number that is not repeated for said plurality of oscillators, f) enabling oscillators and clocking the registers of the linear feedback shift register.

8. The method of claim 7, wherein adjusting the frequency of each oscillator of said plurality of oscillators is done to be primal relative to other oscillators of said plurality of oscillators to produce a high randomized output.

9. The method of claim 7, wherein interposing said XOR circuits between shift register stages is not done for every stage.

* * * * *